(12) United States Patent
Greenwood

(10) Patent No.: US 7,618,338 B2
(45) Date of Patent: Nov. 17, 2009

(54) COOLED PUMP PULLEY

(75) Inventor: David Gareth Greenwood, Shoreham-by-Sea (GB)

(73) Assignee: Ricardo UK Limited, Shoreman-By-Sea, West Sussex (GB)

( * ) Notice: Subject to any disclaimer, the term of this patent is extended or adjusted under 35 U.S.C. 154(b) by 430 days.

(21) Appl. No.: 10/514,957

(22) PCT Filed: Jun. 11, 2003

(86) PCT No.: PCT/GB03/02517

§ 371 (c)(1),
(2), (4) Date: Nov. 18, 2004

(87) PCT Pub. No.: WO03/106845

PCT Pub. Date: Dec. 24, 2003

(65) Prior Publication Data

US 2005/0255951 A1 Nov. 17, 2005

(30) Foreign Application Priority Data

Jun. 13, 2002 (GB) ................... 0213640.6

(51) Int. Cl.
*F16H 57/04* (2006.01)
*F16H 55/36* (2006.01)

(52) U.S. Cl. .................. 474/93; 474/166; 474/184; 474/188; 417/366; 417/362

(58) Field of Classification Search ............... 474/166, 474/184, 188; 417/362, 364, 366, 369, 370; 74/467; F04D 29/04

See application file for complete search history.

(56) References Cited

U.S. PATENT DOCUMENTS 5,967,104 A 10/1999 Nakayoshi et al.
6,089,833 A * 7/2000 Glanfield et al. ............ 417/362

FOREIGN PATENT DOCUMENTS

| DE | 40 35 148 | | 5/1992 |
|---|---|---|---|
| GB | 2 046 372 | | 11/1980 |
| JP | 61-192956 | | 8/1986 |
| JP | 62-110072 | | 5/1987 |
| JP | 62141364 A | * | 6/1987 |
| JP | 62147169 A | * | 7/1987 |
| JP | 5-321889 | | 12/1993 |
| JP | 05321889 A | * | 12/1993 |
| JP | 9-25519 | | 1/1997 |
| JP | 9-25520 | | 1/1997 |
| JP | 09046970 A | * | 2/1997 |

* cited by examiner

*Primary Examiner*—Robert A Siconolfi
*Assistant Examiner*—Thomas W Irvin
(74) *Attorney, Agent, or Firm*—Cowan, Liebowitz & Latman

(57) ABSTRACT

A composite automotive pulley wheel and pump comprises a pulley wheel (2) and a pump (22). The pump comprises an impeller (20) carried on a rotary shaft (6), an inlet region (24) and an outlet region (26). The pulley is mounted on the shaft (6) and comprises a radially outwardly extending support (4) connected to an annular axially extending flange (10, 12), the outer surface of which is adapted to be engaged by a pulley belt. The flange (4) defines a cooling fluid passage (14) within it which extends in the circumferential direction and communicates at two circumferentially spaced positions with an inlet passage (16) and an outlet passage (18), respectively. The inlet and outlet passages (16, 18) extend through the support (4) and the shaft (6) and communicate with the outlet region (26) and the inlet region (24), respectively.

2 Claims, 1 Drawing Sheet

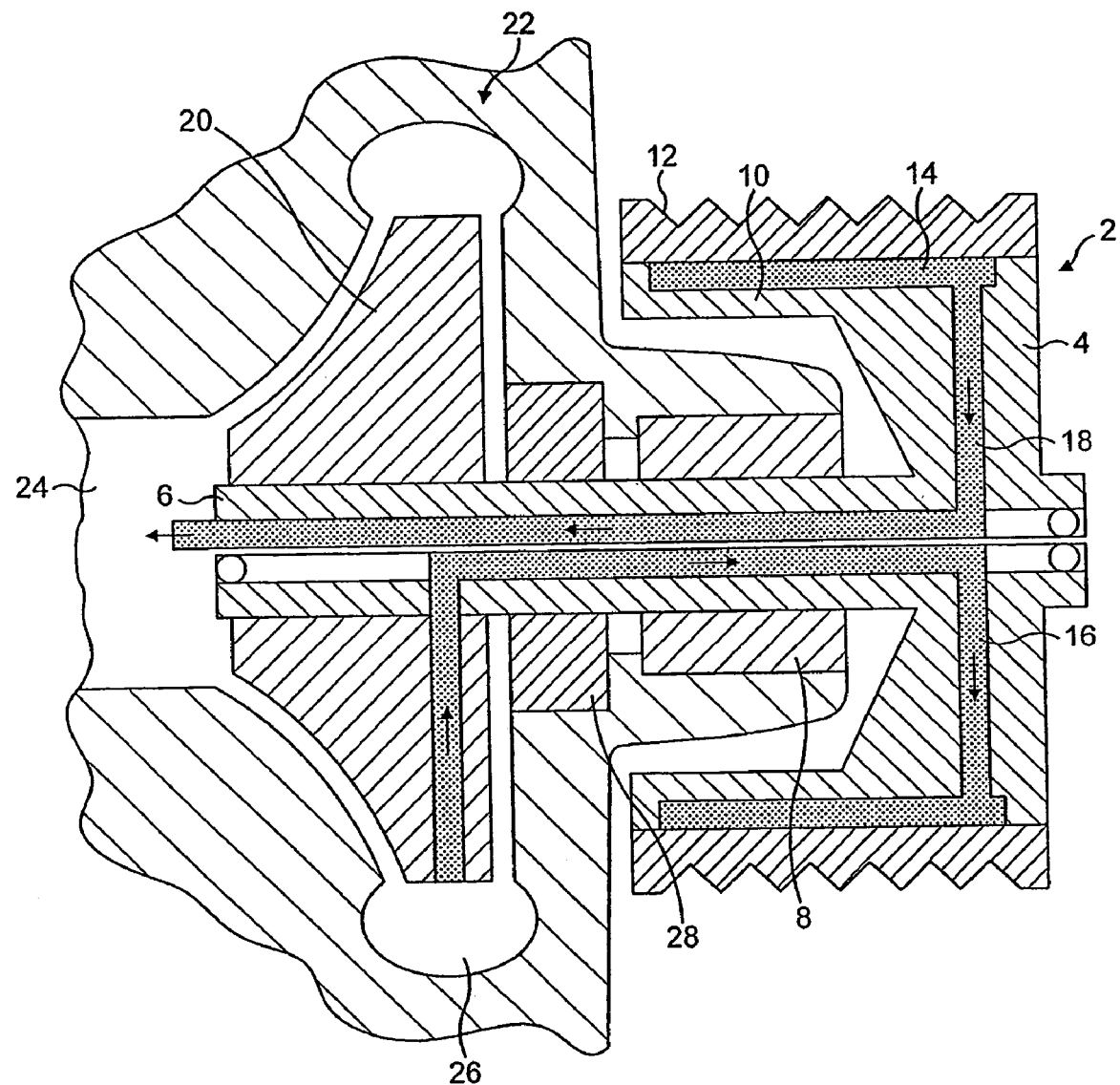

COOLED PUMP PULLEY

The present invention relates to automotive pulley wheels, that is to say pulley wheels which are used on automotive engines and are accommodated in the engine space of a vehicle. Such pulleys are used in conjunction with a pulley belt to transfer power from the engine crankshaft to auxiliary components of the engine such as the water pump, fuel pump, alternator, camshaft and the like.

Vehicle engine spaces are relatively hot and the service life of automotive pulley belts, which were traditionally of V type but are nowadays predominantly of so-called multi-V type, though they may also be of toothed teeth, as is usual with camshaft drive belts, is heavily dependant on the temperature in which they operate. It is found that in the crucial temperature range, the service life of an automotive pulley belt may be reduced by 50% as a result of an increase in temperature of the engine space of only 10° C.

Traditionally vehicle engine compartments have remained below the temperature at which severe thermal degradation of pulley belts occurs by virtue of the substantial natural and forced air flows within them. However, the trend to place ever more components in engine compartments and to increase the provision of noise vibration and harshness (NVH) shrouding in engine compartments is resulting in the amount of free space available for the circulation of cooling air becoming ever smaller with the consequence that the incidence of premature thermal failure of pulley belts is increasing.

The object of the present invention is to provide a sufficient degree of cooling to automotive pulley belts that their tendency to fail prematurely as a result of thermal degradation is substantially reduced.

According to the present invention there is provided an automotive pulley wheel in combination with a pump, the pump comprising an impeller carried on a rotary shaft, an inlet region and an outlet region, the pulley being mounted on the shaft and comprising a radially outwardly extending support connected to an annular axially extending flange, the outer surface of which is adapted to be engaged by a pulley belt, the flange defining a cooling fluid passage within it which extends in the circumferential direction and communicates at two circumferentially spaced positions with an inlet passage and an outlet passage, respectively, the inlet and outlet passages extending through the support and the shaft and communicating with the outlet region and the inlet region, respectively.

Thus the present invention provides a pulley wheel in combination with a pump, typically a water pump though it would also be possible to use a fuel pump, the pulley wheel affording a cooling passage whose ends communicate with the inlet and outlet regions of the pump, whereby the fluid pumped by the pump, typically water, is caused to flow through the pulley by the pressure differential which inherently exits between the inlet and outlet regions of the pump, thereby cooling the pulley and thus also the pulley belt which, in use, is in contact with it.

The present invention is based on the recognition that in order to maintain a pulley belt at a temperature below that at which severe thermal degradation takes place, it is not necessary to cool the engine space in which it is accommodated and it is sufficient merely to locally cool the pulley belt itself. An automotive pulley belt typically extends around a drive pulley mounted on the engine crankshaft, a driven pulley connected to the water pump of the vehicle cooling system, a driven pulley connected to the vehicle alternator and in many cases one or more further pulleys. It is found that causing the pulley belt to pass around the cooled pulley wheel is sufficient to lower the temperature of the entire belt sufficiently to effect a substantial reduction in the thermal degradation of the belt, notwithstanding the fact that only a very small proportion of the length of the belt is in contact with the cooled pulley wheel at any one time.

The inlet region of the impeller of an automotive water pump is inherently at a relatively low pressure whilst its outlet region is at a relatively high pressure. If these two regions are connected together by a passage, water is inherently caused to flow through the passage by virtue of the pressure differential between its ends. If that passage flows through the annular support flange of a pulley wheel, the flow of cooling water will cool the pulley flange and thus the pulley belt in contact with it.

It is possible for the cooling passage in the annular flange of the pulley to extend over only a proportion of the circumference of the pulley, typically 270° or more, and for the inlet and outlet passages to communicate with respective circumferential ends of the passage. In this event, all the flow of the cooling water will flow through the entire cooling fluid passage. It is, however, preferred that the cooling fluid passage extends around the entire circumference of the pulley wheel and that the inlet and outlet passages communicate with the cooling fluid passage at two positions which are circumferentially spaced apart by 180°. In this event, the flow of water from the inlet passage will divide into two flows in opposite directions in the cooling fluid passage and these two flows will meet at the point where the cooling fluid passage communicates with the outlet passage and then flow together through the outlet passage.

Further features and details of the invention will be apparent from the following description of one specific embodiment which is given by way of example only with reference to the accompanying single highly diagrammatic drawing, which is an axial sectional view through a composite automotive water pump and associated drive pulley.

The drive pulley, generally designated 2, includes a radial support 4, which is mounted on a shaft 6 by a bearing 8 and connected to whose outer edge is an annular axially extending flange comprising a support flange 10, connected to and extending around which is a bearing flange 12, the outer surface of which affords a series of adjacent circumferential grooves and is adapted to contact a multi-V drive pulley. Defined between the support flange and the bearing flange is an annular cooling fluid passage 14 which extends around the entire circumference of the pulley. Communicating with the cooling passage 14 at two positions which are circumferentially spaced apart at 180° are an inlet passage 16 and an outlet passage 18, both of which extend radially inwardly through the support 4 and then axially along the shaft 6.

Also mounted on the shaft 6 is the impeller 20 of a water pump generally designated 22. The water pump 22 defines an inlet region 24 on the axis of the pump and an outlet region 26 radially outside the impeller 20. The water pump is sealed from the pulley by an annular seal 28 extending around the shaft 6.

The inlet passage 16 extends radially through the impeller 20 and communicates with the outlet region 26 whilst the outlet passage opens out through the end of the shaft 6 and communicates with the inlet region 24.

In use, a multi-V pulley engages the outer surface of the pulley flange 10, 12 and also extends around a drive pulley mounted on the engine crankshaft and also typically one or more further driven pulleys connected to e.g. the engine alternator, the cam shaft drive pulley and the like. The pump 22 pumps water around the engine cooling system and the inlet and outlet regions 24, 26 are inherently at a relatively low pressure and a relatively high pressure, respectively. This pressure differential results in the flow of cooling water into the inlet passage 16 which then flows in both directions around the cooling fluid passage 14 and thereafter back through the outlet passage 18 to the low pressure region 24. The pulley flange is thus maintained at a relatively low temperature and cools the pulley belt in contact with it, thereby maintaining the pulley belt at a temperature significant below that of the engine compartment in which the pulley belt is accommodated and substantially reducing the rate of thermal degradation of the pulley belt.

Although the invention has been described primarily in connection with pulley wheels for use with multi-V pulley belts, it is of course equally applicable to other types of automotive pulley wheel, such as camshaft drive pulleys, which are typically for use with toothed belts.

The invention claimed is:

1. An automotive pulley wheel in combination with a pump,
    the pump comprising
        an impeller carried on a rotary shaft mounted for rotation about an axis,
        an inlet region and
        an outlet region,
    the pulley wheel carried on the rotary shaft mounted for rotation about the axis and comprising,
        a support extending radially outward from the rotary shaft,
        an annular flange connected to the radially outermost portion of the support and extending parallel to the rotary shaft,
        an outer surface on the annular flange designed to engage a substantial portion of the width of a pulley belt,
        a cooling fluid passage within the flange extending in the circumferential direction extending over a substantial portion of the axial length of the flange, the cooling passage extending parallel to the outer surface of the annular flange so as to conductively cool the outer surface of the annular flange, and
        the cooling passage communicating at two circumferentially spaced positions with an inlet passage and an outlet passage, respectively, the inlet and outlet passages extending through the support and the shaft and communicating with the outlet region and the inlet region, respectively.

2. A pulley wheel as claimed in claim 1 in which the cooling fluid passage extends around the entire circumference of the annular flange and the inlet and outlet passages are angularly offset from one another by 180°.

* * * * *